US008281372B1

(12) United States Patent  (10) Patent No.: US 8,281,372 B1
Vidal  (45) Date of Patent: Oct. 2, 2012

(54) DEVICE, SYSTEM, AND METHOD OF ACCESSING ELECTRONIC MAIL

(76) Inventor: Joel Vidal, New York, NY (US)

( * ) Notice: Subject to any disclaimer, the term of this patent is extended or adjusted under 35 U.S.C. 154(b) by 347 days.

(21) Appl. No.: 12/642,179

(22) Filed: Dec. 18, 2009

(51) Int. Cl.
*G06F 17/30* (2006.01)
*G06F 15/16* (2006.01)
(52) U.S. Cl. ............................................ 726/5; 709/206
(58) Field of Classification Search ...... 726/5; 709/206; 463/229
See application file for complete search history.

(56) References Cited

U.S. PATENT DOCUMENTS

| | | | |
|---|---|---|---|
| 2005/0091318 A1* | 4/2005 | Keohane et al. | 709/206 |
| 2006/0105745 A1* | 5/2006 | Frank | 455/411 |
| 2006/0155715 A1* | 7/2006 | Duffek et al. | 707/100 |
| 2007/0233751 A1* | 10/2007 | Sampson | 707/201 |
| 2007/0244739 A1* | 10/2007 | Soito et al. | 705/10 |
| 2007/0250920 A1* | 10/2007 | Lindsay | 726/7 |
| 2008/0256201 A1* | 10/2008 | Flowers et al. | 709/206 |
| 2008/0275950 A1* | 11/2008 | Jordan | 709/203 |
| 2009/0085744 A1* | 4/2009 | Sellin et al. | 340/572.1 |
| 2009/0165145 A1* | 6/2009 | Haapsaari et al. | 726/28 |
| 2009/0197584 A1* | 8/2009 | Snow et al. | 455/418 |
| 2009/0214034 A1* | 8/2009 | Mehrotra et al. | 380/255 |
| 2009/0328171 A1* | 12/2009 | Bayus et al. | 726/7 |
| 2010/0036917 A1* | 2/2010 | McCaffrey et al. | 709/206 |

FOREIGN PATENT DOCUMENTS

| | | | |
|---|---|---|---|
| JP | 2001-056831 | * | 2/2001 |
| JP | 2007-156675 | * | 3/2002 |
| JP | 2002-073977 | * | 6/2007 |

OTHER PUBLICATIONS

Bailey et al., TwoKind authentication: Protecting private information in untrustworthy environments, Proceedings of the 7th ACM Workshop on Privacy in the Electronic Society, WPES'08, Co-located with the 15th ACM Computer and Communications Security Conference, CCS'08; Dec. 1, 2008.*

* cited by examiner

*Primary Examiner* — Saleh Najjar
*Assistant Examiner* — Shu Chun Gao

(57) ABSTRACT

Device, system, and method of accessing electronic mail. For example, a computerized method includes: receiving an identifier of an email account, and a password; if the password matches a first reference password previously stored in association with said email account, then authorizing a substantially full access to said email account; if the password matches a second reference password previously stored in association with said email account, then authorizing a restricted access to said email account.

34 Claims, 2 Drawing Sheets

DEVICE, SYSTEM, AND METHOD OF ACCESSING ELECTRONIC MAIL

FIELD

Some embodiments are related to the field of electronic mail.

BACKGROUND

Millions of computer users utilize electronic mail (email) on a daily basis, in order to electronically send and receive messages. Email communications allow users to stay in touch with each other, and to communicate easily, rapidly, and in a non-expensive manner even if the users are located many miles apart from each other.

Some email services, sometimes referred to as "web-mail" services, are web-based and allow the user to utilize an Internet browser in order to access his email account. Other email services may allow the user to utilize an email application which may be installed on the user's personal computer, for example, in order to utilize the user's email account using Post Office Protocol 3 (POP3), using Internet Message Access Protocol (IMAP), or using other suitable email-related protocols or standards.

In some email services, e.g., in a web-mail service, the user may be required to enter his unique username (or his unique login-name, or his unique email address), as well as a password, in order to obtain access to his email account. Once the user logs-in to his email account, the user is able to read incoming email messages, compose new email messages and send them, reply to incoming email messages, forward email messages to third parties, perform search operations on email messages, manage or add or delete or edit personal contacts, move email messages between folders, and perform all other email-related operations.

SUMMARY

Some embodiments include, for example, devices, systems, and methods of accessing electronic mail (email).

In some embodiments, for example, an email account may be associated with two (or more) passwords, for example, one password for full access, another password for restricted access. For example, a computerized method may include: receiving an identifier of an email account, and a password; if the password matches a first reference password previously stored in association with said email account, then authorizing a substantially full access to said email account; if the password matches a second reference password previously stored in association with said email account, then authorizing a restricted access to said email account.

In some embodiments, for example, the restricted access may be a read-only access. For example, authorizing the restricted access to the email account may include: authorizing a read-only access to the email account, which authorizes reading of one or more email messages of said email account and un-authorizes composing of one or more email messages, deleting of one or more email messages, sending of one or more email messages, forwarding of one or more email messages, and replying to one or more email messages.

In some embodiments, for example, the restricted access may be a reply-only access. For example, authorizing the restricted access to the email account may include: authorizing only reading of one or more email messages of said email account and replying to one or more email messages of said email account; wherein the replying comprises un-authorizing to add recipients to the one or more email messages to which a reply is sent; wherein authorizing the restricted access comprises un-authorizing to delete one or more email messages and un-authorizing to forward one or more email messages.

In some embodiments, for example, the restricted access may include a "forward-as-is-only" access. For example, authorizing the restricted access to the email account may include: authorizing only (a) reading of one or more email messages of said email account, and (b) non-edited forwarding of one or more email messages of said email account.

In some embodiments, for example, the restricted access may un-authorize the user from deleting email messages. For example, authorizing the restricted access to the email account may include: authorizing an access to said email account, and un-authorizing deletion of one or more email messages of said email account.

In some embodiments, for example, the restricted access may restrict the number of emails that can be sent. For example, authorizing the restricted access to the email account may include: restricting a number of email messages that can be sent from said user account in a login session.

In some embodiments, for example, the restricted access may restrict the number of emails that can be read. For example, authorizing the restricted access to the email account may include: restricting a number of email messages that can be read in said user account in a login session.

In some embodiments, for example, the restricted access may limit the number of email-related operations that may be performed. For example, authorizing the restricted access to the email account may include: terminating said restricted access to the email account upon performance of a pre-defined number of email-related operations in said email account.

In some embodiments, for example, the restricted access may un-authorize at least one type of email-related operations. For example, authorizing the restricted access to the email account may include: un-authorizing performance of at least one type of email-related operations in said email account.

In some embodiments, for example, the restricted access may limit at least one type of email-related operations. For example, the restricted access comprises an access to said email account which authorizes performance of at least one type of email-related operations in said email account and limits the performance of said at least one type of email-related operations relative to said full access.

In some embodiments, for example, the restricted access may disable or limit an email account search function. For example, authorizing the restricted access to the email account may include: disabling, or limiting, or otherwise restricting, a search function of said email account.

In some embodiments, for example, the second reference password expires upon logout from a restricted session. For example, authorizing the restricted access to the email account may include: upon termination of a session of said restricted access to the email account, causing expiration of the second reference password and maintaining validity of the first reference password.

In some embodiments, for example, the second reference password expires after login and before logout. For example, authorizing the restricted access to the email account may include: subsequent to initiation of a session of said restricted access to the email account, and prior to termination of said session of said restriction access to the email account, causing expiration of the second reference password and maintaining validity of the first reference password.

In some embodiments, for example, the first reference password may be used to modify the second reference password, but not vice versa. For example, authorizing the restricted access to the email account may include: un-authorizing to modify the first reference password and un-authorizing to modify the second reference password; wherein authorizing the full access to the email account comprises authorizing to modify the first reference password and authorizing to modify the second reference password.

In some embodiments, for example, the first reference password can be used to modify access or usage privileges of the second reference password, but not vice versa. For example, authorizing the full access to the email account comprises authorizing to modify one or more restrictions associated with the second reference password; and authorizing the restricted access to the email account comprises authorizing to modify one or more restrictions associated with the second reference password.

In some embodiments, for example, the actions performed by a user utilizing the second reference password may be (e.g., invisibly) logged, and the log may be shown only to the user utilizing the first reference password. For example, authorizing the restricted access to the email account may include: tracking operations performed during a session of said restricted access on said email account; making a log report of said operations unavailable for reviewing during said restricted access and during a subsequent restricted access session; making said log report of said operations available for reviewing during a session of said full access to said email account.

In some embodiments, for example, the log report may be sent to the user who knows the first reference password. For example, the method may include: sending said log report to at least one of: (a) another email account, pre-designated during a session of said full access; (b) a mobile phone, using a Short Message Service (SMS) message to a phone number pre-designated during a session of said full access; (c) an Instant Messaging (IM) recipient, using an Instant Message to said IM recipient pre-designated during a session of said full access.

In some embodiments, for example, the log report is sent automatically to the user who knows the first reference password, upon a triggering event. For example, the method may include: sending said log report upon occurrence of at least one of: (a) elapse of a pre-defined time period since beginning of a session of said restricted access to the email account; (b) logout from a session of said restricted access to the email account.

In some embodiments, for example, an immediate alert may be sent to the user who knows the first reference password, upon login to the email account by a user who utilizes the second reference password. For example, the method may include: upon initiation of a session of said restricted access to the email account, sending a notification indicating commencement of said session of restricted access, to at least one of: (a) another email account, pre-designated during a session of said full access; (b) a mobile phone, using a Short Message Service (SMS) message to a phone number pre-designated during a session of said full access; (c) an Instant Messaging (IM) recipient, using an Instant Message to said IM recipient pre-designated during a session of said full access.

In some embodiments, for example, the restricted access may restrict the folders (of the email account) that a user is able to view and/or utilize. For example, authorizing the restricted access to the email account may include: authorizing viewing of content of one or more folders of said email account, and un-authorizing viewing of content of one or more other folders of said email account.

In some embodiments, for example, the restricted access may show to the user who utilizes the second reference password only a portion of a folder of the email account. For example, authorizing the restricted access to the email account may include: for at least one folder of said email account, authorizing viewing of only a portion of content of said folder.

In some embodiments, for example, the restricted access may show to the friend only a portion of a folder which corresponds to the last one day, or two days, or three days (or other pre-defined number of days (or weeks, or months, or years, or hours, or minutes). For example, authorizing the restricted access to the email account may include: for at least one folder of said email account, authorizing viewing of only a portion of content of said folder which corresponds to email messages exchanged within a pre-defined time-period preceding commencement of said restricted access to the email account.

In some embodiments, for example, the restricted access may be provided based on the geographical region in which the user is located. For example, authorizing the restricted access to the email account may include: authorizing access to said email account from a first geographical area, and un-authorizing access to said email account from a second, different, geographical area.

In some embodiments, for example, the restricted access may be based on day-of-week considerations. For example, authorizing the restricted access to the email account may include: authorizing access to said email account on one or more days-of-week, and un-authorizing access to said email account on one or more other days-of-week.

In some embodiments, for example, the restricted access may be based on time-slots. For example, authorizing the restricted access to the email account may include: authorizing access to said email account during one or more time-slots, and un-authorizing access to said email account during one or more other time-slots.

In some embodiments, for example, the restricted access may disallow or may limit the user's ability to open and/or download attachments. For example, authorizing the restricted access to the email account may include un-authorizing to open a file attached to an email message in said email account; and/or un-authorizing to download a file attached to an email message in said email account. In some embodiments, the restriction may be further tailored based on file type, file size, a date or a date-range in which the attached file was received, the number of attachments opened and/or downloaded and/or attached so far by the user, or other parameters.

In some embodiments, for example, the restricted access may disallow or may limit the user's ability to attach file(s). For example, authorizing the restricted access to the email account may include: un-authorizing to attach a file to an email message in said email account. In some embodiments, the restriction may be further tailored based on file type, file size, the number of attachments opened and/or downloaded and/or attached so far by the user, or other parameters. In some embodiments, for example, the restricted access may disallow may limit the user's ability to modify the email account's address book or contact list. For example, authorizing the restricted access to the email account may include un-authorizing at least one of: (a) viewing of an email address book associated with said email account; (b) modifying said email address book associated with said email account.

In some embodiments, for example, the restricted access may show to the user, who utilizes the second reference password, only a subset of the email account based on search query. For example, authorizing the restricted access to the email account may include: authorizing to view only a portion of content of said email account which corresponds to results of a search query applied to said email account, wherein the search query is pre-designated during the full access to said email account.

In some embodiments, for example, the restricted access may authorize the user to perform only a single "reply" operation, and then logs-out the user from the email account. For example, authorizing the restricted access to the email account may include: authorizing only (a) to read one email message of said email account, and (b) to reply to said one email message; wherein replying to said one email messaged comprises un-authorization to add a recipient to said one email message for which a reply is sent; wherein, upon performing said replying to said one email message, the method further comprises: terminating a session of the email account, and causing expiration of the second reference password.

In some embodiments, for example, the restricted access corresponds to a shorter session time. For example, authorizing the restricted access to the email account may include: authorizing access to said email account for a predefined session length which is shorter than a pre-defined session length associated with said full access to the email account.

In some embodiments, for example, the restricted access may add marks or tags or other indications only to the email items that handled by the user who utilizes the second reference password, to indicate such utilization by the user who utilizes the second reference password. For example, authorizing the restricted access to the email account includes: adding a mark to one or more email messages that are handled during the restricted access to the email account, and avoiding to add said mark to email messages that are handled during the full access to the email account.

In some embodiments, for example, the restricted access may add marks or tags or indications of a first type, to email items handled by the user utilizing the first reference password; and may add marks or tags or indications of a second type, to email items handled by the user utilizing the second reference password. For example, authorizing the restricted access to the email account may include: adding a first mark to one or more email messages that are handled during the restricted access to the email account; wherein authorizing the full access to the email account may include adding a second mark to one or more email messages that are handled during the full access to the email account.

Some embodiments may include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
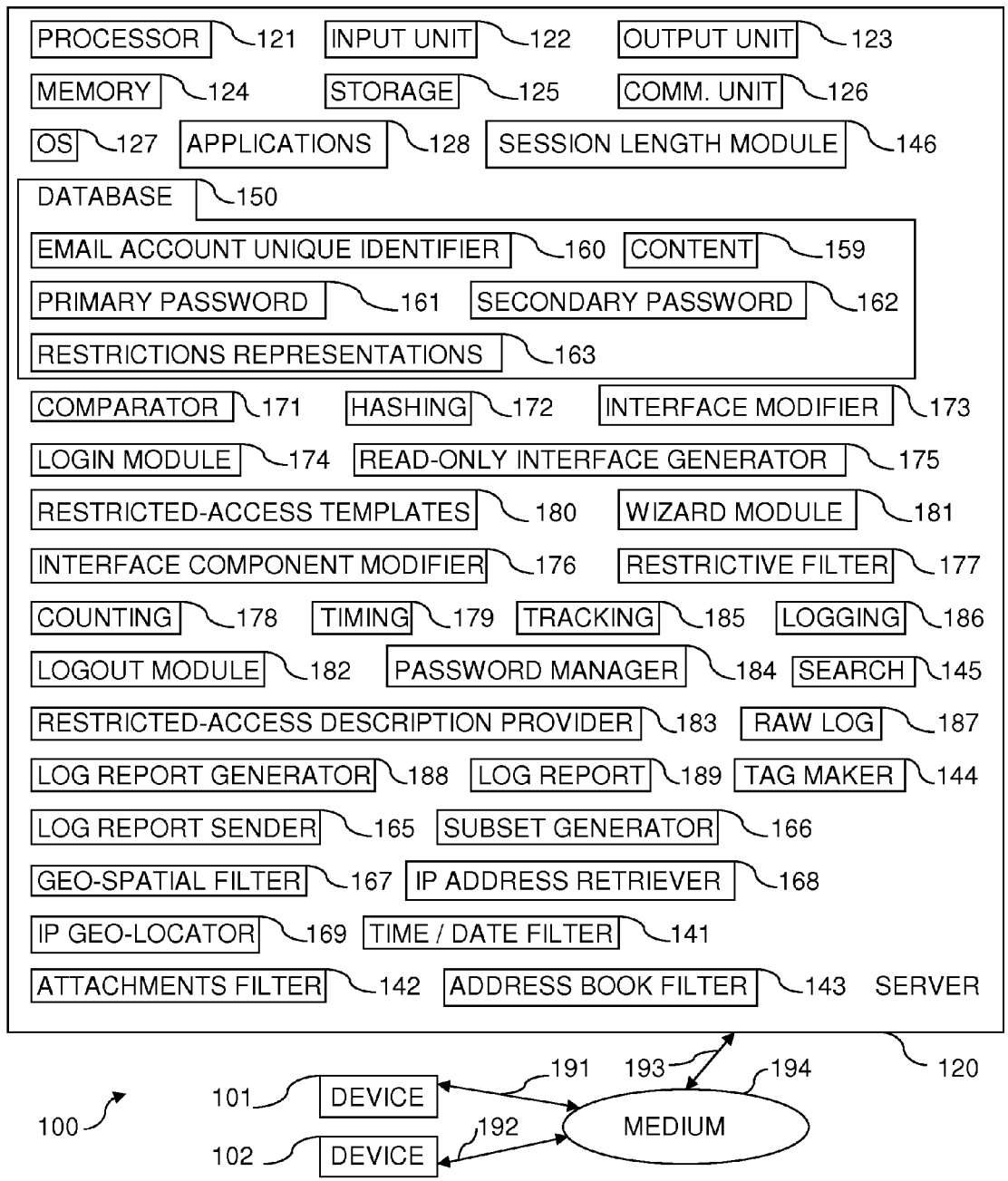
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smart-phone" device, an iPhone or a similar device, an iPod or iPod Touch or similar device, a wired or wireless handheld device (e.g., BlackBerry Curve, Palm Pre), a Wireless Application Protocol (WAP) device, a hybrid device (e.g., combining one or more cellular phone functionalities with one or more PDA device functionalities), a portable audio player, a portable video player, a portable audio/video player, a portable media player, a portable device having a touch-screen, a relatively small computing device, a non-desktop computer or computing device, a portable device, a handheld device, a "Carry Small Live Large" (CSLL) device, an Ultra Mobile Device (UMD), an Ultra Mobile PC (UMPC), a Mobile Internet Device (MID), a Consumer Electronic (CE) device, an "Origami" device or computing device, a device that supports Dynamically Composable Computing (DCC), a context-aware device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3GPP Long Term Evolution (LTE), 3.5G, or the like. Some embodiments may be used in conjunction with various other devices, systems and/or networks.

The terms "wireless device", "wireless computing device", "mobile device" or "mobile computing device" as used herein include, for example, a portable or mobile device capable of wireless communication, a portable or mobile communication device capable of wireless communication, a mobile phone, a cellular phone, a laptop or notebook computer capable of wireless communication, a PDA capable of wireless communication, a handheld device capable of wireless communication, or the like.

The terms "social network", "virtual social network", or "VSN" as used herein include, for example, a virtual community; an online community; a community or assembly of online representations corresponding to users of computing devices; a community or assembly of virtual representations corresponding to users of computing devices; a community or assembly of virtual entities (e.g., avatars, usernames, nicknames, or the like) corresponding to users of computing devices; a web-site or a set of web-pages or web-based applications that correspond to a virtual community; a set or assembly of user pages, personal pages, and/or user profiles; web-sites or services similar to "Facebook", "MySpace", "LinkedIn", or the like.

In some embodiments, a virtual social network includes at least two users; in other embodiments, a virtual social network includes at least three users. In some embodiments, a virtual social network includes at least one "one-to-many" communication channels or links. In some embodiments, a virtual social network includes at least one communication channel or link that is not a point-to-point communication channel or link. In some embodiments, a virtual social network includes at least one communication channel or link that is not a "one-to-one" communication channel or link.

The terms "social network services" or "virtual social network services" as used herein include, for example, one or more services which may be provided to members or users of a social network, e.g., through the Internet, through wired or wireless communication, through electronic devices, through wireless devices, through a web-site, through a stand-alone application, through a web browser application, or the like. In some embodiments, social network services may include, for example, online chat activities; textual chat; voice chat; video chat; Instant Messaging (IM); non-instant messaging (e.g., in which messages are accumulated into an "inbox" of a recipient user); sharing of photographs and videos; file sharing; writing into a "blog" or forum system; reading from a "blog" or forum system; discussion groups; electronic mail (email); folksonomy activities (e.g., tagging, collaborative tagging, social classification, social tagging, social indexing); forums; message boards; or the like.

The terms "web" or "Web" as used herein includes, for example, the World Wide Web; a global communication system of interlinked and/or hypertext documents, files, web-sites and/or web-pages accessible through the Internet or through a global communication network; including text, images, videos, multimedia components, hyperlinks, or other content.

The term "user" as used herein includes, for example, a person or entity that owns a computing device or a wireless device or email account; a person or entity that operates or utilizes a computing device or a wireless device or email account; or a person or entity that is otherwise associated with a computing device or a wireless device or email account.

The term "friend" as used herein includes, for example, another user; a family member; a relative; an acquaintance; a colleague; a co-worker; a person that the user knows from personal, professional or other backgrounds; a person that the user knows from real-world interaction or meeting; and/or a person that the user knows from virtual interaction and/or virtual meeting (e.g., email exchange, instant messaging, online chat, or the like).

At an overview, some embodiments include devices, systems, and methods of accessing electronic mail (email). In some embodiments, a first user (the "owner-user") creates an email account, by designating a username or email address (e.g., "JohnSmith@Gmail.com") and a primary password (e.g., "Swordfish"). Upon creation of the email account, or during the creation process of the email account, or at a subsequent point in time, the owner-user may further designate a secondary password (e.g., "Elephant") to be associated with that email account.

In some embodiments, access to the email account may be gained by entering the unique username or email address, together with either one of the primary password or the secondary password. For example, the user may successfully log-in to the email account "JohnSmith@Gmail.com" by using the primary password ("Swordfish") or by using the secondary password ("Elephant"). In some embodiments, regardless of whether the user entered his primary password or his secondary password, the email system successfully logs-in the user to the email account, and provides to the user substantially full access to that user account.

In other embodiments, logging-in to the email account by utilizing the primary password ("Swordfish") provides the user with substantially full access to the email account; whereas, logging-in to the email account by utilizing the secondary password ("Elephant") provides the user with a non-full access to the email account, namely, a limited access, a restricted access, a partial access, or the like. For example, a user who logs-in to the email account by utilizing the secondary password, may be subject to one or more restrictions or limitations that were pre-designated or pre-set by the owner-user, upon creation of the email account, or subsequently during a login session which utilized the primary password.

In some embodiments, for example, the owner-user may log-in to his email account, by utilizing the primary password; and may define and/or modify one or more limitations, restrictions, and/or conditions which apply to the utilization of the email account upon logging-in with the secondary password. In some embodiments, the owner-user, for example: may restrict the number of email messages which may be read and/or sent and/or composed and/or saved as drafts and/or replied-to and/or forwarded and/or deleted in a session which starts by logging-in using the secondary password; may limit the type and/or number of email-related operations which may be performed on the email account in a session which starts by logging-in using the secondary password; may restrict the time-length of a session which starts by logging-in using the secondary password; or the like.

In some embodiments, the owner-user may keep the primary password confidential, and may avoid disclosure of the primary password to any third party. However, the owner-use may selectively disclose the secondary password to one or more other persons, for example, a friend, a family member, a spouse, a sibling, a parent, a son or daughter, an employer, an employee, an assistant, or other person—which may then be able to gain restricted access to the email account of the owner-user, according to the restrictions and limitations pre-defined by the owner-user.

In some embodiments, the owner-user may log-in to his email account, by utilizing the primary password; and may instruct the email system to alert the user-owner, via one or more communication channels, upon login to the email account using the secondary password. For example, the owner-user may instruct the email system to send to the owner-user an alert via a Short Message Service (SMS) message to a mobile phone of the owner-user; to send to the owner-user an alert via an Instant Messaging (IM) message; to send to the owner-user an alert by electronic mail to another email account designated by the owner-user; to send to the owner-user an alert via a pager or beeper; or the like.

In some embodiments, upon logging-in to the email account by using the secondary password, the email system may track and log the operations performed by the user, optionally in a way which does not disclose to that user that her operations are being tracked and logged. The email system may generate a report, describing the operations performed by that user during the email session which commenced by logging-in with the secondary password. The report may be hidden from the user who logged-in using the secondary password; may be further hidden from that user, or from other subsequent users, who subsequently log-in using the secondary password; but may be available for reviewing by the owner-user, namely, by a user who gains access to the account using the primary password.

Optionally, the owner-user may log-in to the email account using the primary password, and may instruct the email system to automatically send such report(s) to the owner-user, through one or more communication channels (e.g., SMS message, IM message, email message to another email account, pager or beeper alert). Such reports may be automatically sent by the email system to the owner-user, for example, upon termination of an email session (e.g., due to session expiration, or due to a user logout) which began by logging-in using the secondary password; or, within a pre-defined time period (e.g., within five minutes) from the commencement of an email session which began by logging-in using the secondary password; at pre-defined time intervals (e.g., every four minutes) from the commencement of an email session which began by logging-in using the secondary password; or the like.

Some embodiments may include, for example, a dual-password email account or other account, a triple-password email account or other account, a quadruple-password email account or other account, or other multi-password email account or other account; such that at least one of the multiple passwords may be used by the account owner and/or provides the highest level of access (e.g., substantially non-restricted access) to the account and all its features; whereas at least one of the multiple passwords may be used by a friend of the account owner and/or provides a lower level of access, a restricted access, or a limited access to the account, based on limitations, restrictions and/or conditions that are pre-designated by the account owner by utilizing his password.

Although portions of the description herein relate, for demonstrative purposes, to accessing an email account by using two passwords (namely, a primary password and a secondary password), some embodiments may utilize more than two passwords. For example, the owner-user may utilize a primary password to gain full access to the email account; may designate a second password which he may then disclose to his spouse, restricting the performance of certain email-related operations; may designate a third password which he may then disclose to his assistant, restricting the performance of other email-related operations; or the like.

Although portions of the description herein relate, for demonstrative purposes, to accessing an email account by using multiple passwords which provide, respectively, multiple different levels of access privileges to the email account, some embodiments may be used in conjunction with other types of online accounts, virtual accounts and/or real-life accounts, and may provide multiple, respective, sets of access privileges or access restrictions with regard to such accounts. Such accounts may include, for example, an online account associated with a web-site or a web-based service; an online banking account or brokerage account or other financial services account; a real-life bank account accessible through a banking card, telephone banking, Internet banking, Automated Teller Machine (ATM) banking, or the like; customer account at an online merchant (e.g., a customer account at Amazon.com); a user-account at a web-portal (e.g., at Yahoo!, at MSN, at AOL, or the like); a user-account at a job-related website or service (e.g., HotJobs, or Career-Builder); a user-account at a virtual social network (e.g., Facebook, or MySpace, or LinkedIn); a user-account at a message board or online forum; a user account at a paid or non-paid posting forum or message board (e.g., CraigsList); a user-account in a website or service related to real estate properties available for rent and/or sale; a user-account in a website or service related to personal property; a user-account in a website or service related to trading of stocks, shares, bonds, options, securities, commodities, or other financial instruments or items; or the like.

For example, in a demonstrative example of a bank account, the account owner may designate a primary password, which provides her with full access to the bank account; and may further designate a secondary password, which authorizes only partial access to the bank account or which restricts the operations which may be performed, according to conditions, limitations or restrictions which may be pre-defined and modified by the account owner; for example: e.g., allowing only read-only access to the account; un-authorizing to perform wire transfers in general, or international wire transfer, or domestic wire transfers, or wire transfer above a pre-defined threshold amount; un-authorizing to perform bill payments or online payments, in general, or to particular payee(s), or above a pre-defined threshold amount; allowing only to perform bill payments, or particular bill payments, or bill payments to previously-paid payees or only to credit card issuers; allowing only to view information but not to perform any transactions on the account; allowing only to view information of portions of the account, or of particular time period(s); allowing only to sell a financial instrument or asset, and not to purchase, or vice versa; allowing only to liquidate a financial position, and not to create a new one, or vice versa; or the like.

For example, in a demonstrative example of a customer account with a merchant or an online merchant (e.g., Amazon), the account owner may designate a primary password, which provides her with full access to the account; and may further designate a secondary password, which authorizes only partial access to the account or which restricts the operations which may be performed, according to conditions, limitations or restrictions which may be pre-defined and modified by the account owner; for example: allowing only to review previous purchases but not to place new purchases; allowing only to cancel previous purchases but not to place new purchases; allowing only to check the status of previous purchases; allowing only to duplicate or re-do a previous purchase, or to place a new purchase which is identical to a previous purchase; allowing only to re-purchase a previously-purchased item; allowing only to place purchase orders for items that cost under a pre-defined threshold, or for items that cumulatively cost less than a pre-defined threshold; allowing only to place purchase orders for items of certain type(s) (e.g., books and/or music) but not other type(s) (e.g., food items and/or electronic devices); or the like.

For example, in a demonstrative example of a customer account with a financial institution or an online stock trading website (e.g., E-Trade or TD-Ameritrade), the account owner may designate a primary password, which provides her with full access to the account; and may further designate a secondary password, which authorizes only partial access to the account or which restricts the operations which may be performed, according to conditions, limitations or restrictions which may be pre-defined and modified by the account owner; for example: allowing only to sell previously-purchased securities at their market price, and un-authorizing purchase of other securities; un-authorizing to view a history of transactions in the account; allowing only to perform trades that correspond to a total price which is smaller than, or greater than, a pre-defined threshold; allowing only to view information but not to perform any transactions on the account; allowing only to view information of portions of the account, or of particular time period(s); allowing only to sell a financial instrument or asset, and not to purchase, or vice versa; allowing only to liquidate a financial position, and not to create a new one, or vice versa; or the like.

For example, features that are described herein, for demonstrative purposes, in conjunction with an email account, may be used in some embodiments in conjunction with other types of communications and/or accounts, for example, an Instant Messaging (IM) account, a virtual social network account, an online chat account, an online gaming account, or the like. For example, a primary password (e.g., used by the account owner) may allow the user to gain substantially unlimited access to the account; whereas a secondary password (e.g., used by a friend of the account owner) may allow the use to gain only restricted access to the account, e.g., restricted by time length, by available features, by type or number of operations that may be performed, or otherwise restricted in accordance with conditions pre-designated by the account owner while utilizing his primary password.

FIG. 1 schematically illustrates a block diagram of a system 100 in accordance with some demonstrative embodiments. System 100 includes, for example, multiple electronic devices, for example, devices 101-102. Each one of devices 101-102 may include or may be a wired computing device or a wireless computing device or other electronic device, for example, a desktop computer, a laptop computer, a PDA device, a cellular phone, or the like. For example, device 101 may be a non-portable desktop computer; whereas device 102 may be a laptop computer, a notebook computer, a netbook computer, a cellular phone, a mobile phone, a smart-phone, a hybrid PDA device/cellular phone; or the like.

Each one of devices 101-102 may be able to interact with a server 120 through one or more communication channels or mediums, for example, a medium 190, e.g., utilizing wired and/or wireless communication links 191-193. The medium 190 may be or may include, for example, a shared access medium, a global communication network, the Internet, the World Wide Web, a wired network, a wireless network, a combination of one or more wired networks and/or one or more wireless networks, or the like. In some embodiments, medium 190 may include one or more communication networks, for example, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like.

Server 120 may be, for example, an electronic mail (email) server, an email gateway, a proxy server, an Internet server, a Web server, a File Transfer Protocol (FTP) server, an electronic commerce (e-commerce) server, an online merchant server, a cluster or matrix or array of server, a "cloud computing" server or component, and/or other suitable server or computer.

In some embodiments, server 120 may be implemented using suitable hardware components and/or software components, for example, a processor 121, an input unit 122, an output unit 123, a memory unit 124, a storage unit 125, and a communication unit 126. Similar or corresponding components may be included in each one of devices 101-102.

Processor 121 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 121 may execute instructions, for example, of an Operating System (OS) 127 or of one or more applications 128.

Input unit 122 may include, for example, a keyboard, a keypad, a mouse, a touch-pad, a touch-screen, a joystick, a track-ball, a stylus, a microphone, or other suitable pointing unit or input device. Output unit 123 may include, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 124 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 125 may include, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 124 and/or storage unit 125, for example, may store data processed by server 120.

Communication unit 126 may include, for example, a wired or wireless transceiver or transmitter-receiver, a wired or wireless modem, a wired or wireless Network Interface Card (NIC) or adapter, or other unit suitable for transmitting and/or receiving communication signals, blocks, frames, transmission streams, packets, messages and/or data. Optionally, communication unit 126 may include, or may be associated with, one or more antennas or one or more sets of antennas. Such antenna(s) may be or may include an internal and/or external Radio Frequency (RF) antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, some or all of the components of server 120 may be enclosed in a common housing or packaging, and may be interconnected or may be operably associated using one or more wired or wireless links. In other embodiments, components of server 120 may be distributed among multiple or separate devices or locations.

In some embodiments, system 100 may utilize client/server architecture, publisher/subscriber architecture, fully centralized architecture, partially centralized architecture, fully distributed architecture, partially distributed architecture, scalable Peer to Peer (P2P) architecture, or other suitable architectures or combinations thereof.

In some embodiments, server 120 may be or may include, for example, an email server, an email gateway, a server or computer able to provide email services, a web-mail server, a Post Office Protocol 3 (POP3) email server, an Internet Message Access Protocol (IMAP) email server, or the like.

A first user or a primary user, referred to herein as "owner-user", may utilize device 101 in order to create a new email account. For example, owner-user may access a web-mail service (e.g., Gmail, Hotmail, Yahoo! Mail, or the like), and may create a new email account. The owner-user selects a unique email address, for example, by selecting a unique username (e.g., "John Smith") which precedes a common domain name of the email provider (e.g., "Gmail.com"). The owner-user further provides a primary password.

The server 120 creates a new email account; and stores in a database 150 a unique identifier of the new email account, for example, the email address of the email account (e.g., "JohnSmith@Gmail.com"), or the unique username ("JohnSmith") which precedes the common domain name for that email service ("Gmail.com"). The unique identifier of the email account is stored in the database 150, for example, as part of a database record which has additional fields, for example: the first name and last name of the owner-user (e.g., as provided by the owner-user upon creation of the email account), the gender of the owner-user (e.g., as provided by the owner-user upon creation of the email account), the age or date-of-birth of the owner-user (e.g., as provided by the owner-user upon creation of the email account), or the like.

The database 150 further stores, in association with the unique identifier of the email account, the primary password designated by the owner-user; and/or a hashing of the primary password (namely, a result obtained by running a hashing function on the primary password).

During the process of creating the new email account, or during a subsequent log-in to that email account using the primary password, the owner-user may optionally designate a secondary password. The database 150 may further store the secondary password (and/or a hashed value thereof), in association with the unique identifier of the email account.

In some embodiments, each one of the two passwords—the primary password and the secondary password—may be utilized in order to gain substantially full access to the email account, or substantially the same level of access to the email account. For example, the server 120 may subsequently receive a login request, which includes the email address of the email account to be accessed, and a user-entered password. In some embodiments, the server 120 compares the user-entered password (or a hashing thereof) to the primary password (or a hashing thereof) stored in the database 150 in association with the email account to which access is requested. If the compared values match, or are identical, then the server 120 authorizes full access to the email account. If the compared values to do not match, the server 120 proceeds to compare the user-entered password (or a hashing thereof) to the secondary password (or a hashing thereof) stored in the database 150 in association with the email account to which access is requested. If the compared values match, or are identical, then the server 120 authorizes full access to the email account. Otherwise, server 120 refuses the request to access the email account, and notifies the user of the failed login attempt.

In some embodiments, instead of using a two-step comparison process, a single-step or a combined comparison may be performed. For example, server 120 may authorize access to the email account, if the user-entered password is identical to the primary password or the secondary password. Similarly, in some embodiments, server 120 may authorize access to the email account, if a hashing value of the user-entered password is identical to a hashing value of the primary password or to a hashing value of the secondary password.

In some embodiments, during the creation process of the email account, or subsequently to such creation during a login session that began by utilizing the primary password, one or more access-related restrictions, limitations or privileges may be designated. For example, the owner-user may utilize the primary password in order to log-in to the email account, and to configure the email account such that a log-in to the email account using the secondary password shall yield a restricted access or a limited access or a partial access to the email account.

For example, the owner-user may instruct the server 120, that an access to the email account which utilizes the secondary password, shall yield an email usage session in which the server 120 un-authorizes, or disallows, or blocks, or restricts, or otherwise limits, the performance of "compose" operations; and/or the performance of "forward" operations; and/or the performance of "reply to sender" or "reply to all" operations; and/or the performance of "delete" operations; and/or the ability to save draft(s) of email message(s); and/or the ability to search email messages; and/or the ability to view, edit, modify, add, or delete one or more contacts or personal contacts or entries in an address book; and/or the ability to attach one or more files, to open one or more attached files, or to add or remove one or more attach files; the ability to move email message(s) among folders; the ability to tag or un-tag, or mark or un-mark, email messages; the ability to mark email messages as "important" or "urgent" or "high priority" or "read" or "unread"; the ability to archive email messages; the ability to sort email messages using one or more sorting criteria; or the like.

In some embodiments, for example, database 150 may store: a unique identifier of the email account 160; the primary password 161 (and/or a hashed value thereof); the secondary password 162 (and/or a hashed value thereof); and one or more representations 163 of restrictions or limitations to the access or to the usage of the email account if the secondary password (but not the primary password) is utilized in the log-in process. The database 150 may further store the content 159 of the email account, namely, the email messages that are sent, received, composed (e.g., saved as drafts), deleted (e.g., moved to a "trash" folder prior to its being emptied), and other suitable content of the email account (e.g., contacts, address book).

Subsequently, a login attempt may be performed to the email account. For example, the owner-user may disclose the secondary password to a friend ("friend-user"), and may request the friend-user (e.g., by telephone) to access the email account and to perform one or more particular email-related operations. The friend-user may utilize the secondary password in order to login to the email account. The server 120 detects that the secondary password was used in order to access the account, and thus checks in database 150 for the existence of the representations 163 of restrictions or limitations to the access or to the usage of the email account if the secondary password is utilized in the log-in process.

In one demonstrative example, the representations 163 indicate an instruction by the owner-user, to un-authorize any searching of the email account. Accordingly, the server 120 may, for example, grey-out or remove a "search" button or field or interface-component, or may avoid displaying them, in order to un-authorize a search of the email account. Alternatively, such buttons or interface components may be displayed, but upon their engagement (e.g., their selection using the mouse or keyboard), the server 120 may notify the user that the search function is disabled or un-authorized, and the server 120 may avoid performing the requested search. In some embodiments, such information, about the disabling of the search function, may be conveyed to the user explicitly or in advance; for example, using a pop-up window, a banner, an audio-visual or animated message, a tool-tip item, or the like; in other embodiments, such information, about the disabling of the search function, may be hidden from the user or may not be presented or displayed to the user.

In another demonstrative example, the representations 163 indicate an instruction by the owner-user, to un-authorize any attaching of file(s) to an email message being composed. Accordingly, the server 120 may, for example, grey-out or remove an "attach file" button or field or interface-component, or may avoid displaying them, in order to un-authorize attachment of file(s) to an email account. Alternatively, such buttons or interface components may be displayed, but upon their engagement (e.g., their selection using the mouse or keyboard), the server 120 may notify the user that the attach-file function is disabled or un-authorized, and the server 120 may avoid performing the requested search. In some embodiments, such information, about the disabling of the attach-file function, may be conveyed to the user explicitly or in advance; for example, using a pop-up window, a banner, an audio-visual or animated message, a tool-tip item, or the like; in other embodiments, such information, about the disabling of the attach-file function, may be hidden from the user or may not be presented or displayed to the user.

In some embodiments, server 120 may include two or more pre-stored user-interfaces: a first, full-featured user interface, which may be used if the login to an email account utilizes a primary password; and a second, reduced-features or restricted user interface, which may be used if the login to the email account utilizes a secondary password. In some embodiments, different interfaces may be pre-defined by the server 120, and may be statically served to the user upon the utilization of the primary or the secondary passwords, respectively. In other embodiments, a single interface may be used, independent of whether the primary or the secondary passwords are used for logging-in; and the email server 120 may dynamically modify or generate the appropriate user interface based on the representations 163 of restrictions or limitations, for example, by including or excluding interface components (e.g., a "search" button, a "forward" button, a "reply" button", an "attach file" button, a "delete" button, a "move" button, a "sort" interface component, a link to an address book or a contacts list, or the like), by graying-out or striking-out one or more interface components, or by otherwise enabling or disabling the operations of one or more interface components of the email system.

In some embodiments, the owner-user may designate, that a session in the email account which started by using the secondary password, shall expire automatically within a pre-defined time period (e.g., five minutes). The email server 120 may monitor and/or measure the time elapsing since the login to the email account using the secondary password; and once the pre-defined time period elapses, the email server 120 may automatically terminate or expire the session or may otherwise force a logout from the email account.

In some embodiments, the owner-user may designate, that a session in the email account which started by using the secondary password, shall be restricted to a pre-defined number of operations of one or more types (e.g., up to three "send" operations; or up to one "reply to sender" operation). The email server 120 may enforce these restrictions, for example, by using a counter to count the restricted operations, and to un-authorize or block operations beyond the counted quota once it is reached, or to log-out the email session once the threshold number of operations is reached.

In some embodiments, the server 120 may include one or more hardware components and/or software modules, which may be adapted, configured, or tailored-made in order to perform one or more of the operations and/or features described herein.

In some embodiments, for example, server 120 may include a comparator 171 able to compare between a user-entered password and a database-stored password (e.g., a primary password or a secondary password).

In some embodiments, for example, server 120 may include a hashing module 172 able to produce a hashed value of a password (e.g., a user-entered password, a primary password stored in the database, a secondary password stored in the database).

In some embodiments, for example, server 120 may include an interface modifier 173 or an interface generator module, able to generate a full-access user interface for the accessing the email account upon logging-in by using the primary password, and able to generate a restricted-access user interface for the accessing the email account upon logging-in by using the secondary password.

In some embodiments, for example, server 120 may include a login module 174, able to receive a user-name or an email account identifier, together with a user-entered or otherwise user-provided password; and able to authenticate these data items versus corresponding data items stored in the database for accessing the email account. In some embodiments, the login module 174 may generate a ternary output, namely: that the login-attempt failed; or that the login-attempt succeeded by using the primary password and full access to the email account is granted; or that the login-attempt succeeded by using the secondary password and restricted access to the email account is granted. This may be in contrast with a conventional login module, which is able to generate only a binary result of "login failed" or "login succeeded", and/or which is not capable of distinguishing among multiple levels of authorized access to the email account based on different passwords associated with a single username or with a single email account name or with a single email account identifier.

In some embodiments, for example, server 120 may include one or more components or modules able to rapidly generate one or more user interfaces that are associated with a particular level of restricted access (e.g., which is more common among users). For example, if many owner-users define a "read-only access" as a common access profile for a friend-user, then server 120 may include a read-only interface generator 175 able to rapidly generate such type of restricted user interface. Other suitable modules may be used, for example, to accommodate the more-frequent or more-common restricted-access profiles that owner-users typically utilize.

In some embodiments, server 120 may include one or more pre-defined restricted-access templates 180 corresponding to common or system-recommended restricted-access profiles. For example, server 120 may include a "wizard" module 181 or other step-by-step configuration tool, which allows an owner-user to rapidly and efficiently create a restricted-access profile, optionally utilizing the restricted-access templates. In some embodiments, server 120 may ask the owner-user to select a type of relationship between the owner-user and the friend-user (e.g., spouse, parent, child, employee, employer, assistant, close friend, general friend, or the like), and may suggest to the owner-user a set of restrictions and/or limitations that may be appropriate for such friend-user.

For example, the wizard module 181 may suggest to the owner-user, that a restricted-access profile of a friend-user who is an employer (which may be access by using a secondary password), may allow opening of attached files and may disallow "reply to all" operations; whereas a restricted-access profile of a friend-user who is a spouse (which may be accessed by using another secondary password), may allow sending of up to five email messages per hour and may disallowing deleting of email messages. Such sets of restrictions and/or privileges may be suggested to the owner-user as restricted-access templates 180 which the owner-user may choose from, and which the owner-user may adopt and accept "as is" or may optionally further modify or configure to tailor the selected restricted-access template to particular needs with regard to a particular friend-user that the owner-user has in mind.

In some embodiments, for example, server 120 may include an interface component modifier 176, able to modify or remove or avoid-displaying or grey-out or strike-out one or more interface components which correspond to functions or operations that are restricted and/or blocked by the restricted access gained using the secondary password; for example, to grey-out a "search" button, to strike-out a "delete email" button, to add a "bubble" or a tool-tip item to a "move email" button indicating that this function is disabled, or the like.

In some embodiments, for example, server 120 may include an un-authorization filter or another suitable restrictive filter 177. For example, server 120 may be implemented such that the user interface and/or the email service operates, during a restricted-access session, substantially similarly to their operation during a full-access session (e.g., and optionally, substantially all the functions may appear to the friend-user to be available); however, every operation attempted to be performed by the friend-user, is routed first (prior to its execution) to the restrictive filter 177, which checks whether or not the attempted operation (e.g., a "search" operation, a "delete email" operation, a "move email" operation, a "delete contact" operation, or the like) is restricted or allowed, based on the privileges, restrictions and limitations as defined by the owner-user by logging-in using the primary password, and/or as reflected in their corresponding representations 163. The restrictive filter 177 may, for example, approve or authorize the operation and route it to the appropriate hardware component and/or software module for further handling; or, alternatively, may block the attempted operation.

In some embodiments, the blocking of the attempted operation may be notified to the friend-user; in other embodiments, such blocking may not be notified to the friend-user (e.g., who may thus think that the restricted operation succeeded), but may be reported to the owner-user (e.g., via an email message to another account, via SMS, via IM message, via beeper or pager, or the like), or may be added to a log report which tracks the activity of the friend-user.

In some embodiments, for example, server 120 may include a counting module 178, optionally utilizing a counter, a register, an incremental variable, or other suitable components, as well as a logic unit or module associated therewith. For example, a restricted access to the email account may allow the friend-user to perform only up to a pre-defined number of email-related operations, or only up to a pre-defined number of email-related operations of a particular type (e.g., reading up to four email messages; deleting up to two email messages; replying to up to one email message; or the like). The counting module 178 may track and count such operations, and may notify the restrictive filter 177 or another suitable component or module of server 120 once the threshold is reached.

In some embodiments, the counting module 178 may be associated with the interface component modifier 176; for example, once the counting module 178 detects that the friend-user reached her restricted quota of deleting three email messages, the counting module may send a signal to the interface component modifier 176, which may grey-out or strike-out the "delete email" button or interface component, thereby disabling or preventing further utilization of that function.

In some embodiments, the counting module 178 may be associated with, or may include, a timing module 179 or a timer, in order to track utilization of time-dependent quotas. For example, the restricted access to the email account, as defined by the owner-user, may allow the friend-user to send out up to two email messages per hour, starting from the time of logging-in by using the secondary password; or may allow the friend-user to read up to four email messages per hour for a period of up to three hours, starting from the time of logging-in by using the secondary password; and accordingly, the counting module 178 may operate in coordination with the timing module 179 in order to enforce such time-dependent quota(s) or restrictions.

In some embodiments, for example, server 120 may include a logout module 182 or a forced-logout module, able to actively logout the friend-user from the email account if one or more conditions are met. For example, the owner-user may designate that the friend-user shall be authorized to access the email account for up to 30 minutes; and the logout module 182 may automatically logout the friend-user from the email account once the designated time-period elapses.

In some embodiments, for example, server 120 may include a restricted-access description provider 183, which may inform the friend-user, upon his logging-in to the email account by using the secondary password, of: the fact that the friend-user now gains a restricted access to the email account, and not full access; and/or, details about the restrictions which apply on the utilization of the email account by the friend-user (e.g., "You may not delete emails; you may send up to two email messages within the next hour"); and/or details about non-restricted features of the access granted (e.g., "Although you may not delete any emails, you may read any emails without restriction).

In some embodiments, the restricted-access description provider 183 may automatically provide the information to the friend-user upon his logging-in to the email account by using the secondary password; and/or upon request by the friend-user (e.g., by clicking on a link or button of "Show my which restrictions apply to me"); and/or upon performing by the friend-user of a limited email-related operation (e.g., "You have just deleted one email, out of the three emails that you are authorized to delete in total"); and/or upon an attempt to perform by the friend-user of a restricted email-related operation (e.g., "Your attempt to open an attachment has failed, because you are not authorized to open attached files").

In some embodiments, for example, server 120 may include a password manager 184 or other suitable module which allows users to set, reset, modify and/or cancel passwords associated with the email account.

In some embodiments, for example, the password manager 184 may allow the owner-user (who logs-in to the email account by using the primary password) to modify the primary password; but may not allow any friend-user (who logs-in to the email account by using the secondary password) to modify the primary password.

In some embodiments, for example, the password manager 184 may allow the owner-user (who logs-in to the email account by using the primary password) to modify the secondary password; but may not allow a friend-user (who logs-in to the email account by using the secondary password) to modify his secondary password.

In some embodiments, for example, the password manager 184 may allow the owner-user (who logs-in to the email account by using the primary password) to modify the secondary password; and may also allow a friend-user (who logs-in to the email account by using the secondary password) to modify his secondary password. Optionally, the password manager 184 may notify the owner-user of such modification of the secondary password, and/or the modified secondary password, for example, by sending a notification to the owner-user, or by displaying to the owner-user a message about such secondary-password modification at the next time that the owner-user logs-in to the email account (using the primary password).

In some embodiments, for example, the password manager 184 may allow the owner-user (who logs-in to the email account by using the primary password) to revoke or cancel the secondary password; such that a friend-user may no longer be authorized to access the email account using the now-revoked secondary password.

In some embodiments, for example, the password manager 184 may allow the friend-user (who logs-in to the email account by using the secondary password) to revoke (but not necessarily to modify) his secondary password; such that the friend-user may no longer be authorized to access the email account using the now-revoked secondary password. The friend-user may do so, for example, in order to signal to the owner-user that the friend-user is no longer interested in accessing the email account; and/or that the friend-user is no longer responsible for operations done in the email account subsequent to such revocation of his secondary password. Optionally, the password manager 184 may notify the owner-user of such revocation of the secondary password by the friend-user, together with the time and date of such revocation; for example, by sending a notification to the owner-user, or by displaying to the owner-user a message about such secondary-password revocation at the next time that the owner-user logs-in to the email account (using the primary password). Optionally, revocation of the secondary password by the friend-user, may automatically trigger a forced logout from the email account, in order to completely prevent the friend-user from further using the email account after revoking her secondary password.

In some embodiments, for example, the password manager 184 may allow a first friend-user (who logs-in to the email account by using his secondary password) to define another secondary-level password, which the first friend-user intends to share with another, second, friend-user. The additional secondary-level password may be defined to allow the second friend-user to gain an identical level of restricted access to the email account; or, alternatively, to gain a further-reduced level of restricted access to the email account (e.g., having only a subset of the privileges given by the owner-user to the first friend-user). The first friend-user, who utilizes his secondary password to log-in to the email account, may manage the other secondary password in ways similar to the ways that the owner-user may manage the secondary password of that first friend-user. Optionally, the password manager 184 may notify the owner-user upon creation by the friend-user of another secondary password (intended to be shared by the first friend-user with another friend-user); as well as about modifications to that additional secondary password and/or to privileges or restrictions associated therewith. The password manager 184 may allow the owner-user to over-ride the first friend-user, for example, by revoking the additional secondary password that was defined by the first friend-user, by modifying the additional secondary password that was defined by the first friend-user, by modifying the privileges and/or restrictions attached to the access gained by the additional secondary password that was defined by the first friend-user, or the like.

In some embodiments, for example, the password manager 184 may allow the owner-user (who logs-in to the email account by using the primary password) to define additional secondary-level passwords; for example, to define a first secondary-password associated with a first set of access restrictions (e.g., intended to be shared with a spouse of the owner-user); to define a second secondary-password associated with a second set of access restrictions (e.g., intended to be shared with a sibling of the owner-user); to define a third secondary-password associated with a third set of access restrictions (e.g., intended to be shared with an employee of the owner-user); or the like.

In some embodiments, the password manager 184 may automatically expire or revoke a secondary password if one or more conditions, which are designated by the owner-user, are met. For example, the password manager 184 may automatically expire or revoke a secondary password upon a first successful login that utilizes the secondary password; upon a first logout from a login session that started by using the secondary password; at a pre-defined date and/or time (e.g., on Dec. 17, 2009 at 22:45); once the friend-user reaches the maximum quota of email-related operations that were allocated to him (e.g., the friend-user sent out three email messages and deleted two email messages, and he was allowed to perform up to five email-related operations); once the friend-user reaches the maximum quota of email-related operations of a particular type, that were allocated to him (e.g., the friend-user sent out two emails, and he was allowed to send out up to two email messages); once a pre-defined time period (e.g., ten minutes) elapses since the friend-user logged-in to the email account using his secondary password; upon logging-in to the email account by the owner-user by using the primary password (e.g., in order to avoid concurrent access to the email account by both the owner-user and the friend-user); upon logging-in to the email account by an additional friend-user who logged-in by using another secondary-level password (e.g., in order to avoid concurrent access to the email account by two different friend-users); upon receiving of one incoming email message into the email account, or upon receiving of a pre-defined number of email messages into the email account (e.g., to prevent the friend-user from viewing email messages that the owner-user may not yet read); and/or based on other criteria.

In some embodiments, revocation or expiration of the secondary password may be accompanied by a forced logout from an email session which started by logging-in using the now-revoked secondary password. In some embodiments, one secondary password may be revoked, while another secondary password may be maintained valid.

In some embodiments, for example, server 120 may include a tracking module 185 able to track and/or log the operations (e.g., email-related operations) performed on the email account, for example, during a session which begin by using the secondary password. The tracking module 185 may be turned on or turned off, for example, based on the preference of the owner-user who logs in by using the primary password. In some embodiments, the operation of the tracking module 185 may be in the background and/or invisible and/or unknown to the friend-user who logged-in by using the secondary password; in other embodiments, the friend-user may be notified that his operations are tracked, monitored and/or logged.

In some embodiments, the tracking module 185 may operate in conjunction with a logging module 186, in order to create a log of substantially all the operations performed by the friend-user while being logged-in to the email account using the secondary password. Such tracking and/or logging may include, for example, the time and date of each operation; the type of each operation (e.g., a "send" operation, a "delete" operation, a "search" operation); one or more parameters associated with that operation (e.g., the email addresses of recipients for a "send" operation; the search query and/or the search results for a "search" operation); Internet Protocol (IP) address from which the operation was performed; browser name, browser version, Operating System (OS) name and/or version, user agent, and/or other suitable data (e.g., key-logging to record substantially all keystrokes performed by the friend-user, including text that was types and then deleted; mouse-click logging to record mouse-based operations performed by the friend-user). In some embodiments, the tracking module 185 may track, and the logging module 186 may log, deleted email messages, deleted or modified contacts, moved email messages, and other deletions and/or modifications made to the email account.

The logging module 186 may generate, and may substantially continuously update, a raw log 187 of the tracked operations. A log report generator 188 may utilize the raw log 187 in order to generate a user-friendly log report 189 which may be more organized and readable. For example, the log report 189 may include a first entry indicating that "Friend-user logged-in using the secondary password 'Elephant' on Monday, Nov. 9, 2009, at 10:32 AM EST, from IP address 234.189.45.201, using FireFox version 3.5 running on Microsoft Windows Vista"; a second entry indicating that "At 10:33 AM, the friend-user has opened for reading the email message titled 'Order Confirmation' which was received on Nov. 6, 2009 from Sales@Amazon.com"; a third entry indicating that "At 10:35 AM, the friend-user has performed a reply-to-sender to that email message"; a fourth entry indicating that "At 10:36 AM, the friend-user has entered the text 'Please advise the status of this order' and has clicked the 'send email' message"; and a fifth entry indicating that "At 10:37 AM, the email session was automatically logged-out by the email system, since the friend-user has reached the allocated quote which allowed him to perform only one 'read' operation and one 'reply-to-sender' operation".

In some embodiments, the log report 189 may be available for the friend-user for reviewing or reading. In other embodiments, the log report 189 may be hidden from the friend-user, and may not be available for the friend-user for reviewing or reading.

In some embodiments, the log report 189 may be automatically sent to the owner-user of the email account. For example, the server 120 may include a log report sender 165 which may send the log report 189, for example, to one or more of the destinations and/or recipients. For example, the log report sender 165 may send the log report 189 via an email message, to another email account pre-designated by the owner-use. Additionally or alternatively, the log report sender 165 may send the log report 189 via a Short Message Service (SMS) message, to a mobile phone number pre-designated by the owner-user. Additionally or alternatively, the log report sender 165 may send the log report 189 via an Instant Message to an Instant Messaging (IM) recipient designated by the owner-user. Additionally or alternatively, the log report sender 165 may send the log report 189 via a message sent to a beeper or pager number, pre-designated by the owner-user.

In some embodiments, the log report sender 165 may send the log report 189 upon one or more triggering events, for example: upon log-out of the friend-user from the email account; upon expiration of a session of the friend-user; upon a forced logout by the email system of the session of the friend-user; upon elapse of a pre-defined time period (e.g., ten minutes) from the log-in to the email account by the friend-user; at pre-defined time intervals (e.g., every twenty minutes) from the log-in to the email account by the friend-user; upon performance of one or more report-triggering events designated by the owner-user (e.g., deletion of an email message); upon performance of a pre-defined number of email-related operations (e.g., ten email-related operations) performed by the friend-user since his log-in to the email account using the secondary email; upon performance of a pre-defined number of email-related operations of a particular type (e.g., three "reply-to-sender" operations) performed by the friend-user since his log-in to the email account using the secondary email; upon request by the owner-user, e.g., upon receiving by the email account an incoming email message including a pre-defined string (e.g., "SendMeLogReport"); or the like.

In some embodiments, for example, server 120 may include a subset generator 166, able to generate, from substantially the entire email account which is available for full access to the owner-user who logs-in using the primary password, a subset of the email account which may be available (as is, or subject to one or more restrictions or limitations) to a friend-user who logs-in using the secondary password.

For example, the owner-user may designate, that only the "inbox" folder (and no the "deleted items" or the "sent items" folder) shall be available to the friend-user; and/or, that only email messages received or sent during the 14 days preceding the login of the friend-user shall be available to the friend-user; and/or, that only email messages that do not have attached files shall be available to the friend-user who accesses the email account. Based on such designations by the owner-user, the subset generator 166 may select only the corresponding portion of the email account to be presented to the friend-user and/or to be utilized by the friend-user, while hiding, or making unavailable, the remainder portion of the email account that should not be available to the friend-user.

In some embodiments, the subset generator 166 may operate on the email account in conjunction with a search module 145 able to perform search queries on the email account. For example, the owner-user may designate, that the friend-user shall be authorized to view only a portion of the email account which includes all the email messages which include a particular word or term or keyword (e.g., "bank", or "money", or "credit card", or "Amazon") or search query (e.g., "money OR bank", or "Amazon AND order", or "bank AND NOT credit"); for example, in order to authorize the friend-user to access only email communications that pertain to a particular topic.

The search module 145 may be invoked by the subset generator 166 in order to produce a subset of the email account which includes the email messages that include those keywords or search terms pre-designated by the owner-user, in order to enforce the restrictions set by the owner-user which restrict the friend-user to access only that portion of the email account. In some embodiments, the subset of the email account which is available for the friend-user, may include non-consecutive email messages, and/or email messages collected by the search module 145 from two or more folders of the email account, and/or email messages that are not necessarily chronologically inter-related or ordered, or the like.

In some embodiments, for example, server 120 may include a tag maker 144 able to add tag, marks, or other indications to items or email messages that were handled by a friend user. For example, if a friend-user composes and sends an email message from the email account, then the sent email message may appear in the "sent items" folder of the email account; however, to allow the owner-user to easily and rapidly find the email message(s) that were sent by the friend-user, who may co-exist in the "sent items" folder together with email messages sent by the owner-user, the tag maker 144 may automatically tag or mark an email message, shown in the "sent items" folder and send by the friend-user, with an appropriate tag or mark, e.g., "SU" (to indicate that this email message was sent by a Secondary User).

Similarly, an email message deleted by the friend-user may be denoted with "SU", to indicate that the friend-user deleted this item during an email session that began by using the secondary password. Similarly, tagging or marking may be applied to email messages that were moved by the friend-user; to drafts that were composed, edited and/or saved by the friend-user; to folders that were created, edited or deleted by the friend user; to contacts that were added, edited or deleted by the friend-user; or the like. In some embodiments, email messages that are handled by the owner-user may be tagged or marked with a first mark or a first tag (e.g., "PU" or "Primary User"); whereas email messages that are handled by the friend-user may be tagged or marked with a second mark or a second tag (e.g., "SU" or "Secondary User").

In some embodiments, the tag or mark may be, or may include, for example, text, graphics, an icon, a symbol, a check-mark or a "V" mark in a column having a header indicating the marking, a color-coded marking or tagging, a marking or tagging based on font size and/or font type and/or font color and/or font properties (e.g., marking in a bold font, or with an increased-size font, an email message that was read by the secondary user), or other suitable types of tagging or marking. In some embodiments, an email message or an email item may have more than one marking or tags, for example, to indicate that a particular email messages was handled (e.g., read) by both the primary user (with "PU" mark) and a secondary user (with "SU" mark). In some embodiments, the owner-user may be able to instruct the email system to display to the owner-user only the email messages (or other email items, e.g., contacts) that were marked or tagged as being previously handled by the friend-user.

In some embodiments, multiple tags or markings may be used by the system in order to distinguish among more-than-two users who handled email messages in the email account; for example, a tag of "PU" to indicate handling by an owner-user, a tag of "SU1" to indicate handling by a first friend-user, and a tag of "SU2" to indicate handling by a second friend-user. In some embodiments, the system may utilize unique tags, designated by the owner-user, instead of using generic or system-wide tags; for example, based on the designations by the owner-user, a tag of "Adam" may be used instead of "PU" to tag an email message handled by the owner-user; and a tag of "Bob" may be used instead of "SU" to tag an email message handled by the friend-user.

In some embodiments, for example, server 120 may include a geo-spatial filter 167 able to enforce or implement one or more geographic restrictions, spatial restrictions, or other location-based restrictions that the owner-user may designate in association with the usage of the email account by a friend-user who logs-in using the secondary password. For example, an Internet Protocol (IP) address retriever 168 may determine, obtain or otherwise retrieve the IP address of the electronic device utilized by the friend-user to log-in to the email account with the secondary password. An IP address to location converter or IP geo-locator 169 may include, for example, a local or remote IP geo-locator service or module which matches the IP address of the friend-user with a geographic location associated therewith (for example, converting the IP address "68.161.92.62" to the city "Ridgewood" in the state "New York" in the country "United States of America"). The geo-spatial filter 167 may then authorize or un-authorize one or more email-related operations, attempted to be performed by the friend-user, or intended to be presented to the friend-user, based on the geographic location.

For example, the owner-user may designate, that the secondary password may be utilized to log-in, and to access the email account, only from the country of India, and not from other countries; and the email server 120, and/or the geo-spatial filter 167 thereof, may block a login attempt from other countries, based on the retrieved IP address of the user's electronic device. Similarly, for example, the owner-user may designate, that if the secondary password is utilized from an IP address which matches a geo-location outside the United States, then the "delete email" function should be blocked or disabled in the email account; and this restriction may be enforced based on the IP address converted into a geo-location. Similarly, the owner-user may designate, that if the secondary password is utilized from an IP address which matches a geo-location in the state of Florida, then the "search" function should be blocked or disabled in the email account and this restriction may be enforced based on the IP address converted into a geo-location.

In some embodiments, for example, server 120 may include a time-and-date filter 141 (which may include, or may be associated with, a real-time clock or system clock or other time/date tracking unit) able to enforce or implement one or more time-based and/or date-based restrictions or limitations or privileges, that the owner-user may designate in association with the usage of the email account by a friend-user who logs-in using the secondary password.

For example, the owner-user may designate, that the secondary password may be utilized to log-in, and/or to access the email account, only on Saturdays and Sundays (according to a particular time zone designated by the owner-user, for example, Eastern Standard Time (EST)), and not on weekdays; and the time-and-date filter 141 may enforce such restriction, by un-authorizing login and/or usage of the email account, using the secondary password, on other days of the week.

Similarly, the owner-user may designate, that the secondary password may be utilized to log-in, and/or to access the email account, only between 9 AM to 5 PM (e.g., EST) of weekdays, and not during other time-slots, and not during weekend days; and the time-and-date filter 141 may enforce such restriction, by un-authorizing login and/or usage of the email account, using the secondary password, on other time-slots on weekdays, and on weekend days.

In some embodiments, the time-and-date filter 141 may operate at more than one time-point, or may substantially continuously monitor the authorization of the friend-user to access and/or utilize the email account, versus the time-and-date restrictions imposed by the owner-user. For example, a first enforcement of time-and-date restrictions may be applied by the time-and-date filter 141 upon login to the email account using the secondary password; and then, subsequent applications of the time-and-date filter 141 may be performed at pre-defined time intervals (e.g., every four minutes), at pre-defined times of the day (e.g., upon every hour on the hour), at random or pseudo-random time points within a range of time points, upon change of day (e.g., at time point 00:00 AM or at time point 23:59 PM), or the like.

For example, the owner-user may designate, that the secondary password may be utilized to log-in, and/or to access the email account, only between 3 PM to 6 PM (e.g., EST), and not during other time-slots; the friend-user may log-in to the email account at 5:42 PM, using the secondary password; the time-and-date filter 141 may authorize the access to the email account, since the log-in was performed within the allowed time-slot. Then, the time-and-date filter 141 may automatically monitor the elapsing time, for example, every five minutes. Subsequent checks by the time-and-date filter 141 may be performed, therefore, at 5:47 PM, then at 5:52 PM, then at 5:57 PM, each one of them resulting in a continued authorization to the friend-user to utilize the email account. However, a subsequent, automatic, check by the time-and-date filter at 6:02 PM shall result in an un-authorization for continued usage of the email account due to expiration of the allowed time-slot designated by the owner-user. For example, the time-and-date filter 141 may initiate a forced log-out of the friend-user's session from the email account at 6:02 PM, due to the check result performed at that time point. Additionally or alternatively, if the friend-user attempts to perform an email-related operation (e.g., attempts to open an email message for reading, attempts to delete an email message, attempts to compose a new email message, or the like) at 6:01 PM, then, upon such attempt, and prior to execution by the email server 120 of the attempted email-related operation, the time-and-date filter 141 may automatically check whether the utilization of the email account (attempted at 6:01 PM by the friend-user) is still within the boundaries of the allowed time-slot; and if the check result is negative, as in this demonstrative example, then the date-and-time filter 141 may block or un-authorize the performance of the attempted email-related operation; may notify the friend-user that that the attempted operation failed due to time-slot expiration; and may logout the friend-user from the email account (e.g., a forced log-out or other automatic method to end the user's email session) at 6:01 PM, accordingly. In some embodiments, the time-and-date filter 141 may enforce the time and/or date restrictions using smaller time intervals (e.g., every minute), in order to ensure that the email account session indeed expires upon the ending of the designated time-slot, and not beyond it.

In some embodiments, for example, server 120 may include an attachments filter 142 able to enforce or implement one or more restrictions or limitations or privileges, that the owner-user may designate in association with the usage of file(s) attached to incoming and/or outgoing email messages, or to other suitable objects (e.g., objects or digital items which may be embedded within email messages) by a friend-user who logs-in to the email account using the secondary password.

For example, the owner-user may designate, that if the secondary password is utilized to log-in into the email account, then the friend user, for example, may not be authorized to open and/or download and/or view and/or print any attached files; may not be authorized to open and/or download and/or view and/or print an attached file which is greater than, or smaller than, a pre-defined threshold size (e.g., 300 kilobytes); may not be authorized to open and/or download and/or view and/or print attached file(s) of one or more types (e.g., graphics, audio, video, word processing, spreadsheet); may not be authorized to open and/or download and/or view and/or print any attached files that were received before a particular time/date, or from one or more particular senders; or the like.

In some embodiments, the attachments filter 142 may hide from the friend-user, or may avoid displaying to a friend-user, indications that a file is attached to an email message, if the friend-user is unauthorized to open, download, view and/or print such attached file, based on the designations defined by the owner-user.

In some embodiments, the attachments filter 142 may prevent the friend-user from forwarding an attached file, by itself and/or together with forwarding an email message; for example, if the friend-user attempts to forward an email message, which has a file attached thereto which the friend-user is not authorized to open or download or view or print, then the attachments filter 142 may automatically remove such attached file from the draft of the email message being forwarded or from other type of forwarding mechanism of the email account.

In some embodiments, the attachment filter 142 may prevent the friend-user from attaching files; from attaching more than a pre-defined number of files (e.g., not more than three files); to attach a file which is greater than a pre-defined size (e.g., not more than 500 kilobytes); to attach one or more files which have a total size greater than a pre-defined value (e.g., not more than 2.5 megabytes); to attach files of a particular type (e.g., word processing, spreadsheet, audio, video, presentation, executable); to attach files that were created and/or modified before or after a designated time/date, or within a particular designated recent time/date period; to attach files that have or include a particular word or string in their name (e.g., "draft", "confidential", "personal", "private", "bank", "credit card") or within the file itself (e.g., by utilizing a module which scans the internal content of the file, attempted to be attached, in search for the un-authorized keywords or terms); or the like.

In some embodiments, for example, server 120 may include an address book filter 143 or other suitable contact list filter, able to enforce or implement one or more restrictions or limitations or privileges, that the owner-user may designate in association with the usage of contacts, email contacts, personal contacts, address book entries, or other similar items ("contacts") associated with the email account or being a part of the email account.

For example, the owner-user may designate that the entire address book may not be available to the friend-user; that one or more portions of the address book (e.g., contacts that are tagged or marked as "work") may not be available to the friend-user, whereas other one or more portions of the address book (e.g., contacts that are tagged or marked as "friend") may be available to the friend-user; that the address book, or portions thereof, may not be opened or viewed by the friend-user, may not be used by the friend-user, may not be edited by the friend user, and/or may not be modified by the friend-user; that contact(s) in the address book may not be deleted by the friend-user; that the friend-user may not be authorized to add contacts to the address book; or the like.

In some embodiments, for example, server 120 may include a session length module 146, which may: measure and/or track the time length of a session of utilizing the email account, e.g., by a friend-user who logs-in to the email account using the secondary password; and compare the current session length to the maximum session length authorized for the friend-user, as designated by the owner-user. I the current session length (e.g., of the friend-user who utilizes the email account) is greater than or equal to the maximum session length authorized, then the session length module 146 may operate to expire or terminate or revoke the current session of the friend-user, e.g., by forcing a server-side logout or by otherwise ending the current session.

In some embodiments, the session length module 146 may operate in order to prevent the friend-user from attempting to log-in again to the email account in order to bypass a session length restriction set by the owner-user. For example, the owner-user may designate, that the friend-use shall be authorized to access the email account for a session length of up to 30 minutes per session, and for a cumulative length (of multiple sessions) of up to 50 minutes per 24-hour period, and such that at least 2 hours elapse between sessions. If the friend-user logs-in at 7:00 AM, then the session length module 146 shall terminate the session at 7:30 AM, in order to enforce the first restriction. Then, if the friend-user attempts to log-in again at 8:00 AM, then the session length module 146 denies access of the friend-user to the email account, in order to enforce the third restriction. Then, if the friend-user logs-in to the email account at 11:00 AM, then the session length module 146 authorizes the access to the email account, but terminates the session at 11:20 AM, in order to enforce the second restriction.

In some embodiments, the maximum session length authorized to a friend-user, may be significantly shorter than the maximum session length authorized to the owner-user. For example, a session length of the friend-user may be restricted to 10 minutes, or 25 minutes, or 45 minutes; whereas a session length of the owner-user may be substantially non-restricted, or may be restricted to two weeks, one week, one day, eight hours, or the like.

In some embodiments, an email account may be associated with two (or more) passwords: for example, a primary password to allow full access to the email account, and a secondary password to allow partial or restricted access to that email account. For example, email server 120 (or a component thereof) may be able to receive a login-name for an email account and a user-entered password; and, if the user-entered password matches a first reference password previously stored in association with said email account, the email server is to authorize a full access to said email account; whereas, if the user-entered password matches a second reference password previously stored in association with said email account, the login module is to authorize a restricted access to said email account.

In some embodiments, for example, the restricted access may be or may include a read-only access. For example, the restricted access comprises a read-only access to said email account which authorizes reading of one or more email messages of said email account, and un-authorizes composing of one or more email messages, deleting of one or more email messages, sending of one or more email messages, forwarding of one or more email messages, and replying to one or more email messages; as well as other email-related operations, for example, modifying and/or reading and/or deleting one or more entries in an address book or in a contact list or in a personal calendar, and modifying settings or options of the email account itself. Other suitable operations may be restricted or limited, or authorized or un-authorized, for example: marking email messages as "spam" or as "not spam"; creating, editing or deleting folders in the email account; marking and/or tagging email messages (e.g., as "unread", as "important", etc.) or un-marking or un-tagging email messages; permanently emptying the "trash" folder of deleted messages; or the like.

In some embodiments, for example, the restricted access may be or may include a reply-only access. For example, wherein the restricted access comprises an access to said email account which authorizes reading of one or more email messages of said email account and authorizes replying to one or more email messages of said email account, wherein the replying comprises un-authorization to add recipients to the one or more email messages for which a reply is sent; and the restricted access comprises an access which un-authorizes composing of one or more new email messages, deleting of one or more email messages, and forwarding of one or more email messages.

In some embodiments, for example, the restricted access may be or may include a "forward as-is only" access. For example, the restricted access comprises an access to said email account which authorizes reading of one or more email messages of said email account and authorizes as-is forwarding of one or more email messages of said email account, wherein the as-is forwarding comprises un-authorization to edit an email message being forwarded.

In some embodiments, for example, the restricted access restricts or blocks the user's ability to delete email messages. For example, the restricted access comprises an access to said email account which un-authorizes or blocks or restricts deleting of one or more email messages of said email account.

In some embodiments, the restricted access restricts the number of emails that can be sent. For example, the restricted access comprises an access to said email account which restricts or limits a number of email messages that can be sent from said user account in a login session; and/or within a pre-defined time period (e.g., within 12 hours of logging-in using the secondary password); and/or within pre-defined time intervals (e.g., per each four-hour time-slot which begins upon logging-in using the secondary password.

In some embodiments, for example, the restricted access restricts the number of emails that can be read. For example, the restricted access comprises an access to said email account which restricts or limits a number of email messages that can be read in said user account in a login session; and/or within a pre-defined time period (e.g., within 12 hours of logging-in using the secondary password); and/or within pre-defined time intervals (e.g., per each four-hour time-slot which begins upon logging-in using the secondary password.

In some embodiments, the restricted access may limit the number of email-related operations which are authorized or allowed to be performed. For example, the restricted access comprises an access to said email account which expires upon performance of a pre-defined number of email-related operations in said email account; and/or expires upon performance of a particular pre-defined email related operation (e.g., upon responding once to the last e-mail received in the email account).

In some embodiments, the restricted access is to un-authorize at least one type of email-related operations which can be performed. For example, the restricted access comprises an access to said email account which un-authorizes performance of at least one type of email-related operations in said email account.

In some embodiments, the restricted access is to limit at least one type of email-related operations which can be performed. For example, the restricted access comprises an access to said email account which authorizes performance of at least one type of email-related operations in said email account and limits the performance of said at least one type of email-related operations relative to said full access.

In some embodiments, the restricted access blocks or limits a "Search" function of the email account. For example, the restricted access comprises an access to said email account which un-authorizes or restricts performance of a search function in said email account.

In some embodiments, the secondary password expires upon logout from an email session that was started by using the secondary password. For example, upon termination of a session of said restricted access, the email server is to cause expiration of the second reference password and to maintain validity of the first reference password.

In some embodiments, the secondary password expires upon a login which utilizes the secondary password; and this may, for example, avoid opening of two email sessions in parallel (e.g., in two different computers or devices) using the secondary password. For example, upon initiation of a session of said restricted access, the login module is to cause expiration of the second reference password and to maintain validity of the first reference password.

Some embodiments may block or disallow or un-authorize opening of two sessions in parallel, or concurrently, or simultaneously, or during overlapping or partially-overlapping time periods, in general, or from two or more electronic devices, or from two or more different web-browsers or email client applications, or from two or more Internet Protocol (IP) addresses, or the like. Some embodiments may disallow opening of another session of the email account, while a current session is already open and/or active and/or not logged-out yet.

Some embodiments may allow concurrent sessions of the email account, for example, in which the owner-user is logged-in to the email account using the primary password, and the friend-user is logged-in to the email account using the secondary password; or, in which two friend-users are logged-in to the email account, using two (identical or different) secondary passwords; whereas other embodiments may disallow such concurrent activity. Some embodiments may allow concurrent sessions, in which one friend-user is logged-in to the email account using the secondary password, and another friend-user is logged-in to the email account using the same secondary password or using another secondary-level password (e.g., a non-primary password); whereas other embodiments may disallow such concurrent activity.

In some embodiments, the primary password can be used in order to modify the secondary password, but not vice versa. For example, said full access comprises authorization to modify the first reference password and authorization to modify the second reference password; and, said restricted access comprises un-authorization to modify the first reference password and un-authorization to modify the second reference password.

In some embodiments, the primary password may be used to modify privileges of the secondary password, but not vice versa. For example, said full access comprises authorization to modify one or more privileges associated with the restricted access; and, said restricted access comprises un-authorization to modify one or more privileges associated with the restricted access.

In some embodiments, the email server may track, monitor and log the actions performed during an email session which started by using the secondary password; shows the log only to the owner-user, e.g., upon a subsequent login using the primary password. For example, the restricted access comprises an access to said email account which: (a) tracks operations performed during a session of said restricted access on said email account, to generate a log report; (b) makes said log report unavailable for reviewing during said restricted access and during a subsequent restricted access session; and/or (c) makes said log report available for reviewing during a session of said full access to said email account.

In some embodiments, the email server may send the log report to the owner-user. For example, a reporting module of the email server may send said log report to at least one of: (a) another email account, pre-designated during a session of said full access; (b) a mobile phone, using a Short Message Service (SMS) message to a phone number pre-designated during a session of said full access; and/or (c) an Instant Messaging (IM) recipient, using an Instant Message to said IM recipient pre-designated during a session of said full access.

In some embodiments, the log report is sent automatically to the owner-user. For example, the reporting module is to automatically send said log report upon occurrence of one or more of the following events: (a) elapse of a pre-defined time period since beginning of a session of said restricted access; and/or (b) logout from a session of said restricted access.

In some embodiments, the email server is to send immediate alert to the owner-user, upon login by the friend-user utilizing the secondary password. For example, the email server may include or may utilize a reporting module; and, upon initiation of a session of said restricted access, the reporting module is to send a notification, indicating that said session of restricted access began, to at least one of: (a) another email account, pre-designated during a session of said full access; and/or (b) a mobile phone, using a Short Message Service (SMS) message to a phone number pre-designated during a session of said full access; and/or (c) an Instant Messaging (IM) recipient, using an Instant Message to said IM recipient pre-designated during a session of said full access.

In some embodiments, the restricted access restricts or limits the types or names of the folders that the friend-user may view or utilize. For example, the restricted access comprises an access to said email account which authorizes viewing of content of one or more folders of said email account, an un-authorizes viewing of content of one or more other folders of said email account.

In some embodiments, the restricted access is to show to the friend-user only a portion of a folder of the email account, based on pre-defined criteria designated by the owner-user. For example, the restricted access comprises an access to said email account which, for at least one folder of said email account, authorizes viewing of only a portion of content of said folder.

In some embodiments, the restricted access is to show to the friend-user only a portion of a folder which corresponds to a recent time period (e.g., the last 4 hours, the last 30 days, the last 30 minutes), and not more. For example, the restricted access comprises an access to said email account which, for at least one folder of said email account, authorizes viewing of only a portion of content of said folder which corresponds to email messages exchanged within a pre-defined time-period preceding initiation of said restricted access.

In some embodiments, the restricted access may pose access restrictions or may unauthorized access based on geographical region in which the electronic device which attempts to utilize the secondary password is located. For example, the restricted access comprises an access to said email account which authorizes access to said email account from a first geographical region, and un-authorizes access to said email account from a second, different, geographical region.

In some embodiments, the restricted access may include restrictions based on day-of-week. For example, the restricted access comprises an access to said email account which authorizes access to said email account on one or more days-of-week, and un-authorizes access to said email account on one or more other days-of-week.

In some embodiments, the restricted access may be based on time-slots per day. For example, the restricted access comprises an access to said email account which authorizes access to said email account during one or more time-slots per day, and un-authorizes access to said email account on one or more other time-slots per day.

In some embodiments, the restricted access may limit or restrict the user's ability to open one or more or all attachments (e.g., allow opening of a graphics file; disallow opening of a word processing file; allow opening of a spreadsheet file that is greater than 400 kilobytes; or the like). For example, the restricted access comprises an access to said email account which un-authorizes opening of a file attached to an email message of said email account.

In some embodiments, the restricted access may limit or restrict the user's ability to download one or more or all attachments, or attachment of a particular type (e.g., disallow downloading of a graphics file; allow downloading of a word processing file; disallow downloading of a spreadsheet file that is greater than 100 kilobytes; or the like). For example, the restricted access comprises an access to said email account which un-authorizes downloading of a file attached to an email message of said email account.

In some embodiments, the restricted access may limit or restrict the user's ability to attach file(s). For example, the restricted access comprises an access to said email account which un-authorizes attaching of a file to an email message intended to be sent from said email account.

In some embodiments, the restricted access restricts modifying of an address book or a contact list of the email account. For example, the restricted access comprises an access to said email account which un-authorizes at least one of the following operations: (a) viewing of an email address book associated with said email account; and/or (b) modifying an email address book associated with said email account.

In some embodiments, the restricted access may show to the friend-user only a subset or portion of the email account. For example, the restricted access comprises an access to said email account which authorizes viewing of only a portion of content of said email account which corresponds to results of a search operation applied to said email account using a search query pre-designated during said full access.

In some embodiments, the restricted access permits only a single "Reply to sender" operation. For example, the restricted access comprises an access to said email account which authorizes reading of only one email message of said email account and authorizes replying to only said one email message; wherein the replying comprises un-authorization to add recipients to said one email message for which a reply is sent; wherein upon performing said replying to said one email message, the login module is to automatically: (1) terminate a logged-in session of the email account, and (2) cause expiration of the first of said two or more reference passwords.

In some embodiments, the restricted access may include enforcement of a shorter email session time. For example, the restricted access comprises an access to said email account for a predefined session length which is shorter than a predefined session length associated with said full access.

Some embodiments may provide a login module, an email service or server, an authentication module, or an email interface which, unlike conventional systems, is able to receive as input an email account identifier, together with one of two or more possible passwords allowing access to that email account; and able to provide access to a single email account if a user-provided password is identical to one of the two or more passwords.

In some embodiments, the user trying to access the email account, need not type or enter a different username, or a different email account name, or domain name, or other identifier or indication, in order to gain various levels of access to the same email account. For example, in some embodiments, an email account identified as "JaneSmith@Yahoo.com" may be accessed by the user (or by multiple users), either by entering the email account identifier ("JaneSmith@Yahoo.com") together with the primary password ("Swordfish"), or by entering the same email account identifier ("JaneSmith@Yahoo.com") together with the secondary password. In some embodiments, the same level of access to the email account (e.g., full access) may be granted to the user upon each one of these alternatives. In other embodiments, the first alternative provides the user with full access to the email account; whereas the second alternative provides the user with restricted access to the email account. In some embodiments, the user need not log-in to the email account using an "administrator" log-in name or identifier or password, in order to obtain a higher or different level of access; rather, the user may be a conventional non-administrator user with non-administrator privileges or credentials, and may still utilize two user-created passwords (a primary password and a secondary password) in order to gain two different levels of access to her own email account.

In some embodiments, the owner-user may opt to utilize a secondary password in order to gain restricted access to his email account, even though the owner-user may know his own primary password. For example, the owner-user may utilize a third-party computer, or an un-trusted computer (e.g., at a public library or at an Internet kiosk), or an un-trusted communication link (e.g., a non-secured wireless communication link or network), in order to access her email account; and may feel more comfortable to utilize her secondary password in such situation, instead of using her primary password. For example, if the secondary password is stolen or obtained by a third party, then the third party shall gain only the restricted access to that email account, instead of gaining full access. If, for example, the restricted access associated with the secondary password is a read-only access which authorizes the user to only read email messages that were received in the past seven days, then the possible damage to the email account, from a third party who obtained the secondary password, is significantly reduced, relative to the possible damage from obtaining the primary password (which allows, for example, to delete email messages, to send email messages, to change the primary password itself and thus block future access to the email account, or the like).

In some embodiments, the system provides an end-user, who is not an administrator of the system and does not control the email system, a web-based email service or a web-mail service which allows the end-user to independently and/or autonomously create an email account (e.g., a web-mail email account) which may be associated with a first user-defined password to gain full access, and with a second user-defined password to gain restricted access. These features may be achieved autonomously by the end-user, without requiring the end-user to have privileges and/or credentials of a system administrator, and without requiring the end-user (or the user who subsequently logs-in to the email account) to enter a particular indication regarding the type of user logging-in.

In some embodiments, the friend-user who utilizes the secondary password to log-in to the email account, may not be notified about the one or more restrictions or limitations attached with her restricted access to the email account, and may not be aware of such restrictions or limitations.

Figure 2:
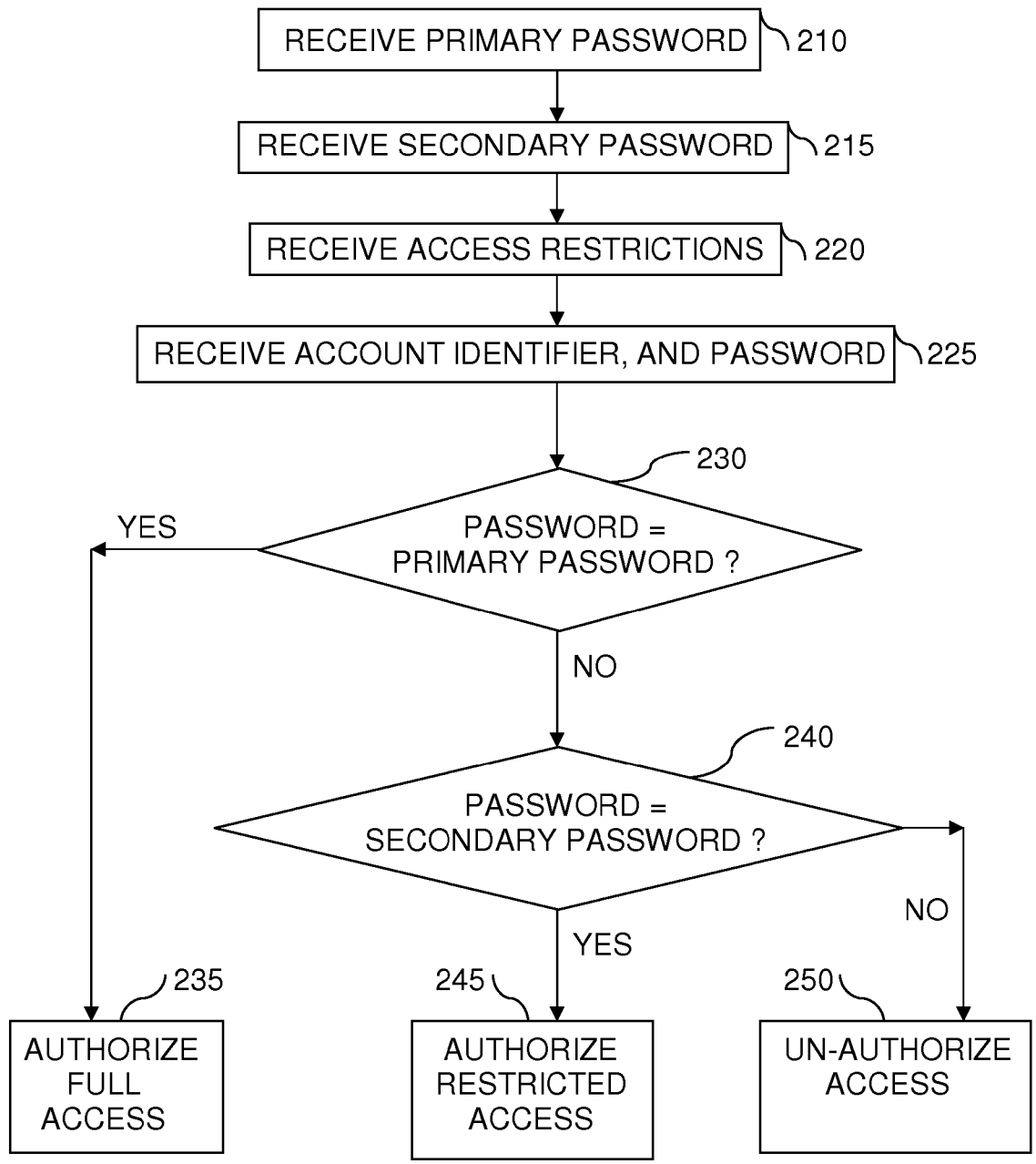
FIG. 2 is a schematic flow-chart of a method of accessing electronic mail, in accordance with some demonstrative embodiments.

FIG. 2 is schematic flow-chart of a method of accessing electronic mail, in accordance with some demonstrative embodiments. Operations of the method may be used, for example, by system 100 of FIG. 1, and/or by other suitable units, servers, devices and/or systems.

In some embodiments, the method may include, for example, receiving from an owner-user a primary password ("first reference password") associated with an email account (block 210).

In some embodiments, the method may include, for example, receiving from the owner-user a secondary password ("second reference password") associated with that email account (block 215).

In some embodiments, the method may include, for example, receiving from the owner-user a one or more access restrictions or utilization restrictions, to be applied to the email account upon log-in to the email account using the secondary password (block 220).

In some embodiments, the method may include, for example, receiving from a user: an email account identifier, and a user-entered password (block 225).

In some embodiments, the method may include, for example, checking whether or not the user-entered password matches the primary password (block 230).

If the user-entered password matches the primary password, then the method may include, for example, authorizing to the user full access to the email account (block 235).

In contrast, if the user-entered password does not match the primary password, then the method may proceed with the operations of block 240 and onward. As indicated at block 240, the method may include, for example, checking whether or not the user-entered password matches the secondary password.

If the user-entered password matches the secondary password, then the method may include, for example, authorizing to the user a restricted access to the email account (block 245). This may be followed, for example, by substantially continuously tracking the utilization of the email account, and enforcing email utilization restrictions on an ongoing basis with regard to the email account.

In contrast, if the user-entered password does not match the secondary password, then the method may un-authorize any access to the email account (block 250).

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A computerized method comprising:
    creating an email account associated with a first reference password designated by a user;
    during a session in which the user is logged-in to the email account by using the first reference password, receiving from the user a designation of a user-selected second reference password for said email account, wherein the second reference password comprises a single-use password;
    receiving an identifier of an email account, and a password;
    if the password matches a first reference password previously stored in association with said email account, then authorizing a full access to said email account;
    if the password matches a second reference password previously stored in association with said email account, then authorizing a restricted access to said email account;
    upon termination of a session of said restricted access to the email account, causing expiration of the second reference password and maintaining validity of the first reference password;
    wherein the method is to be implemented by an electronic device comprising at least a hardware component.

2. The computerized method of claim 1, wherein authorizing the restricted access to the email account comprises:
    authorizing a read-only access to the email account, which authorizes reading of one or more email messages of said email account and un-authorizes composing of one or more email messages, deleting of one or more email messages, sending of one or more email messages, forwarding of one or more email messages, and replying to one or more email messages.

3. The computerized method of claim 1, wherein authorizing the restricted access to the email account comprises:
    authorizing only reading of one or more email messages of said email account and replying to one or more email messages of said email account,
    wherein the replying comprises un-authorizing to add recipients to the one or more email messages to which a reply is sent,
    wherein authorizing the restricted access comprises un-authorizing to delete one or more email messages and un-authorizing to forward one or more email messages.

4. The computerized method of claim 1, wherein authorizing the restricted access to the email account comprises:
    authorizing only (a) reading of one or more email messages of said email account, and (b) non-edited forwarding of one or more email messages of said email account.

5. The computerized method of claim 1, wherein authorizing the restricted access to the email account comprises:
    authorizing an access to said email account, and un-authorizing deletion of one or more email messages of said email account.

6. The computerized method of claim 1, wherein authorizing the restricted access to the email account comprises:
    restricting a number of email messages that can be sent from said user account in a login session.

7. The computerized method of claim 1, wherein authorizing the restricted access to the email account comprises:
    restricting a number of email messages that can be read in said user account in a login session.

8. The computerized method of claim 1, wherein authorizing the restricted access to the email account comprises:
    terminating said restricted access to the email account upon performance of a pre-defined number of email-related operations in said email account.

9. The computerized method of claim 1, wherein authorizing the restricted access to the email account comprises:
    un-authorizing performance of at least one type of email-related operations in said email account.

10. The computerized method of claim 1, wherein the restricted access comprises an access to said email account which authorizes performance of at least one type of email-related operations in said email account and limits the performance of said at least one type of email-related operations relative to said full access.

11. The computerized method of claim 1, wherein authorizing the restricted access to the email account comprises: disabling a search function of said email account.

12. The computerized method of claim 1, wherein authorizing the restricted access to the email account comprises:
upon termination of a session of said restricted access to the email account, causing expiration of the second reference password and maintaining validity of the first reference password.

13. The computerized method of claim 1, wherein authorizing the restricted access to the email account comprises:
subsequent to initiation of a session of said restricted access to the email account, and prior to termination of said session of said restriction access to the email account, causing expiration of the second reference password and maintaining validity of the first reference password.

14. The computerized method of claim 1, wherein authorizing the restricted access to the email account comprises:
un-authorizing to modify the first reference password and un-authorizing to modify the second reference password;
wherein authorizing the full access to the email account comprises:
authorizing to modify the first reference password and authorizing to modify the second reference password.

15. The computerized method of claim 1,
wherein authorizing the full access to the email account comprises authorizing to modify one or more restrictions associated with the second reference password;
wherein authorizing the restricted access to the email account comprises authorizing to modify one or more restrictions associated with the second reference password.

16. The computerized method of claim 1, wherein authorizing the restricted access to the email account comprises:
tracking operations performed during a session of said restricted access on said email account;
making a log report of said operations unavailable for reviewing during said restricted access and during a subsequent restricted access session;
making said log report of said operations available for reviewing during a session of said full access to said email account.

17. The computerized method of claim 16, comprising: sending said log report to at least one of:
(a) another email account, pre-designated during a session of said full access;
(b) a mobile phone, using a Short Message Service (SMS) message to a phone number pre-designated during a session of said full access;
(c) an Instant Messaging (IM) recipient, using an Instant Message to said IM recipient pre-designated during a session of said full access.

18. The computerized method of claim 16, comprising: sending said log report upon occurrence of at least one of:
(a) elapse of a pre-defined time period since beginning of a session of said restricted access to the email account;
(b) logout from a session of said restricted access to the email account.

19. The computerized method of claim 1, comprising:
upon initiation of a session of said restricted access to the email account, sending a notification indicating commencement of said session of restricted access, to at least one of:
(a) another email account, pre-designated during a session of said full access;
(b) a mobile phone, using a Short Message Service (SMS) message to a phone number pre-designated during a session of said full access;
(c) an Instant Messaging (IM) recipient, using an Instant Message to said IM recipient pre-designated during a session of said full access.

20. The computerized method of claim 1, wherein authorizing the restricted access to the email account comprises:
authorizing viewing of content of one or more folders of said email account, and un-authorizing viewing of content of one or more other folders of said email account.

21. The computerized method of claim 1, wherein authorizing the restricted access to the email account comprises:
for at least one folder of said email account, authorizing viewing of only a portion of content of said folder.

22. The computerized method of claim 1, wherein authorizing the restricted access to the email account comprises:
for at least one folder of said email account, authorizing viewing of only a portion of content of said folder which corresponds to email messages exchanged within a pre-defined time-period preceding commencement of said restricted access to the email account.

23. The computerized method of claim 1, comprising:
upon an attempt to log-in to said email account, from a particular geographical area, by using the first reference password, authorizing access to said email account from a first said particular geographical area, and
upon an attempt to log-in to said email account, from said particular geographical area, by using the second reference password, un-authorizing access to said email account from a second, different, said particular geographical area.

24. The computerized method of claim 1, comprising:
upon an attempt to log-in to said email account, on a particular day-of-week, by using the first reference password, authorizing access to said email account during said particular day-of-week; and
upon an attempt to log-in to said email account, on said particular day-of-week, by using the second reference password, un-authorizing access to said email account during said particular day-of-week.

25. The computerized method of claim 1, wherein authorizing the restricted access to the email account comprises:
authorizing access to said email account during one or more time-slots, and un-authorizing access to said email account during one or more other time-slots.

26. The computerized method of claim 1, wherein authorizing the restricted access to the email account comprises:
un-authorizing to open a file attached to an email message in said email account.

27. The computerized method of claim 1, wherein authorizing the restricted access to the email account comprises:
un-authorizing to download a file attached to an email message in said email account.

28. The computerized method of claim 1, wherein authorizing the restricted access to the email account comprises:
un-authorizing to attach a file to an email message in said email account.

29. The computerized method of claim 1, wherein authorizing the restricted access to the email account comprises:
un-authorizing at least one of:
(a) viewing of an email address book associated with said email account;
(b) modifying said email address book associated with said email account.

30. The computerized method of claim 1, wherein authorizing the restricted access to the email account comprises:

authorizing to view only a portion of content of said email account which corresponds to results of a search query applied to said email account, wherein the search query is pre-designated during the full access to said email account.

31. The computerized method of claim 1, wherein authorizing the restricted access to the email account comprises:

authorizing only (a) to read one email message of said email account, and (b) to reply to said one email message, wherein replying to said one email messaged comprises un-authorization to add a recipient to said one email message for which a reply is sent, wherein, upon performing said replying to said one email message, the method further comprises:

terminating a session of the email account, and causing expiration of the second reference password.

32. The computerized method of claim 1, wherein authorizing the restricted access to the email account comprises:

authorizing access to said email account for a predefined session length which is shorter than a pre-defined session length associated with said full access to the email account.

33. The computerized method of claim 1, wherein authorizing the restricted access to the email account comprises:

adding a mark to one or more email messages that are handled during the restricted access to the email account, and avoiding to add said mark to email messages that are handled during the full access to the email account.

34. The computerized method of claim 1, wherein authorizing the restricted access to the email account comprises adding a first mark to one or more email messages that are handled during the restricted access to the email account, wherein authorizing the full access to the email account comprises adding a second mark to one or more email messages that are handled during the full access to the email account.

* * * * *